United States Patent [19]

Phillips

[11] 3,924,901

[45] Dec. 9, 1975

[54] PARTICLE BUILD UP SUPPRESSOR

[76] Inventor: Woodrow W. Phillips, 3136 Clairmont Road NE., Atlanta, Ga. 30329

[22] Filed: May 3, 1973

[21] Appl. No.: 356,808

[52] U.S. Cl. .............. 302/64; 55/462; 55/DIG. 25; 209/133; 264/117
[51] Int. Cl.² ........................................ B65G 53/52
[58] Field of Search ....... 55/17, 447, 461, 462, 464, 55/DIG. 25; 209/132, 133, 136, 147, 154, 502; 241/5, 40; 264/117, 121, DIG. 50; 302/6, 9, 28, 59, 62, 64

[56] References Cited
UNITED STATES PATENTS

| | | | |
|---|---|---|---|
| 12,908 | 5/1855 | Horton | 209/133 X |
| 248,584 | 10/1881 | Frink | 209/147 |
| 824,945 | 7/1906 | Miller | 302/28 |
| 877,460 | 1/1908 | Brunner et al. | 55/464 X |
| 1,044,418 | 11/1912 | Reed | 302/28 X |
| 1,230,757 | 6/1917 | Morrison | 209/136 |
| 1,233,965 | 7/1917 | Bishop et al. | 209/27 |
| 1,885,645 | 11/1932 | Vawter | 302/64 X |
| 2,255,442 | 9/1941 | Tranter | 302/28 |
| 2,474,695 | 6/1949 | Schneible et al. | 55/461 |
| 2,572,862 | 10/1951 | Israel | 302/28 |
| 2,834,059 | 5/1958 | Hoelzel | 302/64 X |
| 3,075,559 | 1/1963 | Sharp et al. | 302/64 X |
| 3,254,475 | 6/1966 | Farr et al. | 55/462 X |
| 3,355,864 | 12/1967 | Sobeck | 55/462 X |
| 3,555,794 | 1/1971 | Gable et al. | 209/154 X |

FOREIGN PATENTS OR APPLICATIONS

| | | | |
|---|---|---|---|
| 1,015,342 | 3/1950 | France | 302/58 |

Primary Examiner—Evon C. Blunk
Assistant Examiner—Jeffrey V. Nase
Attorney, Agent, or Firm—Cushman, Darby & Cushman

[57] ABSTRACT

A method and apparatus for performing the method is disclosed for use in the removal and collection of suspended particulate matter carried by a pressurized fluid stream moving within a conduit. The apparatus is connected to the conduit so as to be positioned at/or adjacent the low velocity-energy region or critical zone thereof. Preferably, it is positioned at a bend or elbow of the conduit. By this particular arrangement there is effectuated a trapping of particles that settle from a high velocity-energy region to a low velocity-energy region. Also disclosed are two types of fin-like devices that increase particulate fall-out. One type is a plow-like separator that can be either continuous or non-continuous and is effective to deflect particulate matter around the periphery of the conduit and into the low velocity-energy region, where the particles are trapped. The second type is either biased or non-biased and can be selectively positioned so as to be equally as effective in handling dry or tacky material in the stream. Both types of fin-like devices are selectively positioned with respect to the elbow adjacent the high velocity-energy region so as to further optimize the deflection of the particles into the apparatus.

34 Claims, 15 Drawing Figures

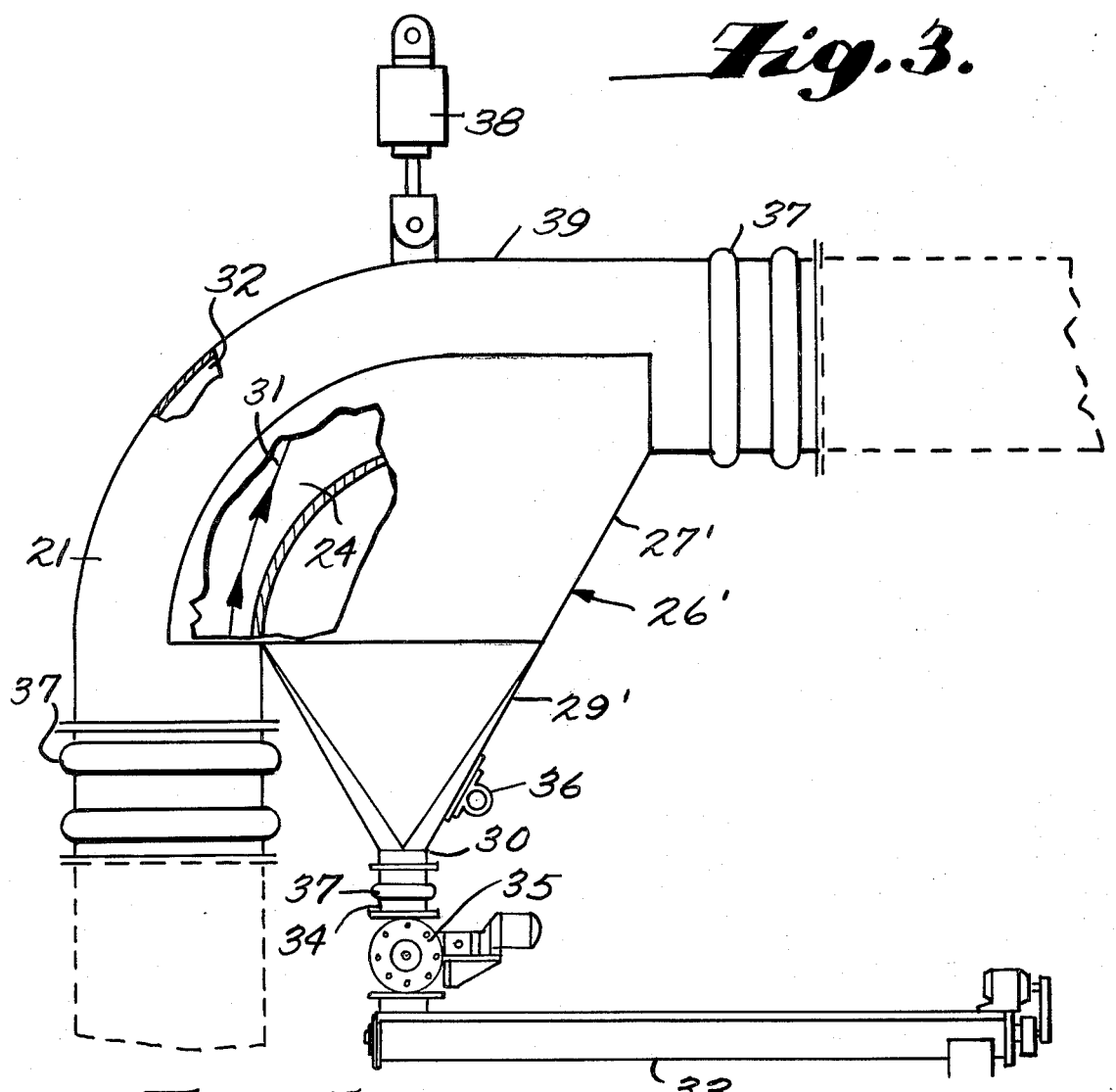
Fig. 3.
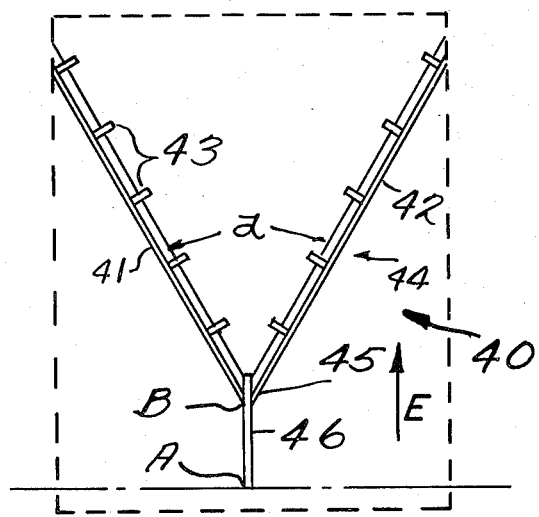
Fig. 5A.
Fig. 5B.

PARTICLE BUILD UP SUPPRESSOR

BACKGROUND OF THE INVENTION

1. Field of the Invention

The instant invention is directed to a method and apparatus that suppresses the build-up of particulate matter carried in suspension by a pressurized fluid stream traveling through a conduit system especially about the bends thereof.

2. Description of the Prior Art

Every industrial establishment requires the use of one or more air-handling systems. Industrial air-handling systems can be categorized into four general types:

1. Air handling systems for climate control purposes, such as heating, ventilating, air conditioning and dehumidification;

2. Air handling systems for environmental purposes, such as dust removal and collection for improved working conditions;

3. Air handling systems for process purposes such as drying, cooling, classifying or aspirating a product or byproduct; and 4. Air handling systems for transportation purposes so as to transport a product or byproduct from one location to another.

For example, of the above described air handling systems, the systems used for environmental and process purposes are normally a high velocity once-through or open-ended circuit design, through which large amounts of particulate matter can be emitted to the atmosphere and thereby cause or create serious problems of air pollution as well as the loss of valuable materials which could otherwise be reclaimed for reuse.

One of the prior art arrangements for handling dust in these types of system comprises:

a prime mover, primary collection equipment and secondary collection equipment.

The prime mover is usually an industrial type centrifugal blower. Normally, the prime mover or the blower will be located in the area of the cleanest air or gas. This minimizes the possibility of build-up on the rotor and means less maintenance, cost and time will be required. Usually the blower is placed at the discharge end of the system and the air or gas is pulled through the system at velocities high enough to convey the particles. Therefore, the primary and secondary collection equipment operate under negative pressure conditions in the systems of this type.

The primary collection equipment can be one of several different types such as a wet scrubber, a cloth collector, a venturi scrubber, or an electrostatic precipitator. However, there are many more types for specific problems.

The secondary collection equipment is usually a cyclonic separator. Gravity settling chambers provide another type but they require such large volumes of space and have such low operating efficiencies that they are almost never used. The cyclonic separators are therefore the most frequently used secondary collection equipment in modern design air or gas handling systems. The purpose of the secondary collection equipment is to remove the larger size particles so that they can be returned to the process for reprocessing and thereby allow the primary collection equipment to function at a higher degree of effectiveness.

A typical arrangement of this prior art would have a conduit duct connecting the air or gas outlet of the process or manufacturing equipment with the inlet to the secondary collection equipment or cyclonic separator. A second conduit duct would connect the air or gas outlet of the cyclonic separator with the air or gas inlet to the primary collection equipment and a third conduit duct connects the air or gas outlet of the primary collection equipment with the inlet to the blower. The blower exhausts through the stack to the atmosphere. This system is not effective in eliminating build-up at/or adjacent the critical zone of a bend.

These are prior art units of different configurations that attempt to eliminate dust build-up in the type of system described above. A short description of examples of these other types of prior art units and the attendant disadvantages thereof are:

1. a long radius elbow fitted with turning vanes would create problems of cleaning when build-up occurs on the vanes, therefore, only very dry non-adhering material under controlled conditions of temperature and humidity could be used;

2. a right angle elbow fitted with aerodynamic turning vanes would offer the same problems as the previously discussed turning vanes, plus it would have a higher operating cost due to increases in pressure drop in the conduit;

3. a converging elbow would offer high manufacturing and operating costs;

4. a baffle elbow would create high manufacturing costs, high operating costs as well as create space problems;

5. a venturi would offer high operating costs and space problems; and 6. air jets would offer varied operating problems such as induced turbulence, thereby permitting build-up further downstream and also possible condensation.

Of the foregoing discussed possibilities, additional disadvantages are that none offers the advantage of reducing and removing the particulate matter from the low velocity-energy region of a bend in the system.

In addition to the aforenoted prior art devices, there are several others that are intended to trap particulate matter suspended in a pressurized fluid stream. Such devices are exemplified in the U.S. Pat. to Bishop et al. No. 1,233,965 and Lissman No. 2,047,568.

In the Bishop et al, patent there is disclosed a device upon which nuts are moved along towards one end of a table. At the one end of the table, the nuts enter a throat of a conduit. In the throat, a blower is operatively associated with the end of the table so as to be effective to cause blanks or empty nuts to be forced upwardly through the conduit, while leaving the heavier nuts on the shaker table. A trap is positioned adjacent the throat of this conduit for receiving the blanks that are drawn upwardly through the throat.

The patent to Lissman discloses both a method and apparatus for separating suspended particles from a gaseous medium. In operation, this device introduces gas at a suitable velocity through an inlet. The gas, in passing through the inlet, passes around a deflecting passage, so that the inertia of the suspended particles tends to push such particles towards the outer portion of the gas stream. A discharge spout is located at this high velocity-region of the passage so as to trap and separate the heavier suspended particles.

The aforenoted prior art patents are also not capable of preventing the clogging of a conduit system about the low velocity-energy region, especially at/or adjacent the inner radius of a bend.

The cause for this failure will be hereinafter discussed. If a longitudinal section of a vertical portion of conduit duct upstream of the cyclonic separator is examined, and the velocity of the air or gas within the conduit duct is represented by vectors, it would be discovered that the air or gas at the center of the conduit duct moves much faster than the air or gas around the periphery of the conduit duct.

Additionally, consider the particulate carried by the air or gas stream to be uniformly dispersed in the air or gas and of a size gradient ranging from sub micron to thousands of microns. Consider then that the terminal velocity of a particle is dependent upon the shape, specific gravity and size of the particle. Consider further, that a system handling particulate matter of a specific kind, contains particles all of uniform shape and of the same specific gravity. Then, the terminal velocity of a particle in that system varies according to size. This means that particles of different sizes within the air or gas stream of a system travel at different speeds.

Therefore, as the concentration of the particulate in the air or gas stream increases, the proximity of particles to other particles increases and likewise the probability of collision between particles increases.

Then, if a conduit duct is traversed to the entrance of a bend or elbow in the conduit system and the conditions stated above prevail, it would be noted from a cross sectional view of the conduit duct that a low velocity-energy region exists around the periphery of the conduit duct and a high velocity-energy region exists at the center.

The low velocity-energy air or gas and the particulate within it that prevailed at the entrance to the bend, that does not fall under the influence of the dominating energy portion of the air or gas stream, trails off to make up the low velocity-energy region at the inner radius of the bend. The larger particles in this portion of the air or gas stream settle out in this low velocity-energy region and a build-up of particles begins.

Additionally, particles in the high velocity-energy region of the air or gas stream are forced closer together by the compressing action brought about by changing directions and because of the acceleration and deceleration of the particles this results in a collision of particles which forces other particles from the high velocity-energy region of the air or gas stream, into the low velocity-energy region, thereby increasing particle build-up. In this manner, an initial build-up occurs.

After the initial build-up of particles occurs, an orifice is formed within the conduit duct. Then, because of the difference between the internal angle of shear of the particles and the expansion angle of the air or gas at the higher velocity, a low velocity-energy region downstream of the build-up is created. As the air or gas at the higher velocity flows through the orifice, it forms a vena-contracta. The result of the vena-contracta is that the air or gas does not expand immediately upon passing through the orifice. Consequently, build-up is permitted to grow. As the build-up grows, the vena-contracta moves further downstream and the build-up process continues. Eventually the build-up reaches a point where it can enter other equipment with a resulting decrease in operating efficiency.

SUMMARY OF THE INVENTION

Accordingly, it is an object of the present invention to overcome the aforementioned disadvantages of the prior art by providing a method and apparatus for performing the method, that suppresses dust or particle build-up in a conduit system containing one or more bends. The instant invention is effective on any kind of particles, ranging from dry and fee flowing to moist, sluggish flowing and tacky. It is also effective on particles having a size gradient distribution in which a portion thereof is 5 microns or larger.

The apparatus of the present invention used to accomplish the aforenoted object is a dust suppressor. The apparatus provides a receptacle for the particles to settle into at/or adjacent the low velocity-energy region of a conduit bend. The air or gas handling conduit duct therefore remains cleaner for longer operating periods and the velocity of the air or gas at the inlet to other equipment will be more uniform. COnsequently, these items of equipment will be able to function at maximum efficiency and the maintenance time required to clean the air or gas handling conduit ducts will be minimized.

The dust suppressor apparatus has a funnel or hopper-like receptacle which can take many shapes. The designs thereof can be varied to suit a wide variety of application problems and to fit field conditions with regards to available space and headroom requirements. However, in all applications thereof, the sidewalls of the suppressor are formed at an angle that exceeds the angle of shear for the particles and in this way prevent any build-up of particles along the sidewalls.

The object is further accomplished by a device that discharges the collected particles. This device can be a butyl rubber flutter valve, a rotary airlock feeder or any other similar type unit that effectively maintains the conduit pressure while discharging the collected particles.

It is a further object of the invention to provide means that promotes additional separation of particles from the stream for subsequent reclaiming of valuable material and/or for providing pollution abatement. This further object is accomplished by the provision of either of two types of fin-like devices. The first of these fin-like devices is effective in deflecting particles around the periphery of the conduit duct, into the low velocity-energy region of the critical zone and thereafter into the receptacle of the dust suppressor. The second of these fin-like devices is effective to promote increased collision of the particles within the air or gas stream. The increased collision causes deflection of additional particles toward the low velocity-energy region at/or adjacent the critical zone of a conduit bend and thereafter into the receptacle of the dust suppressor.

If, for example, there is a desire to increase the reclamation of valuable material from the fluid stream or provide pollution abatement, the dust suppresor apparatus as aforedescribed is provided with a fin-like device in the form of either a continuous or non-continuous plow. The continuous plow has two diverging relatively flat surfaces that are effective to contact the high velocity-energy region of the stream of suspended particles to effectuate deflection of particles around the periphery of the conduit duct into the low velocity-energy region of the critical zone and thence into the dust suppressor receptacle. Instead of the continuous plow, a non-continuous plow can be utilized. The non-continuous plow is a plurality of flat surfaced members that are selectively positioned within the conduit bend at the high velocity-energy region thereof so as to function in a manner similar to the continuous plow. These plows are attached to the conduit wall by a suitable fastener means so as to be self-cleaning.

The second type of fin-like device used to increase particulate fall-out thereby providing for reclamation of valuable products and/or pollution abatement is a plurality of either biased or non-biased fin-like separators having both a snub end surface and an aerodynamic end surface. The unbiased separator has a snub end surface which is relatively flat and rearwardly inclined so as to depend into the stream. The biased separator is similar to the unbiased, plus the snub end surface is cut at an oblique angle so as to deflect the particulate towards the low velocity-energy region of the stream. The amount of deflection is determined by varying this oblique angle.

Opposite the snub end surface is an aerodynamic end surface that is primarily used when wet, tacky or sticky particles are being conveyed. The aerodynamic surfaces while not only deflecting the particles, are effective to cause agglomeration of the sticky particles and in this way produce heavier particles. This results in that the heavier particles move downwardly into the center of the stream and increase the incidence of collision.

The latter object is also accomplished by arranging the plows and the snub-end, aerodynamic end devices in positions adjacent the high velocity-energy region of the outer-inner wall of the bend. The arrangement further enhances the separating function of both types of devices.

As is apparent from the foregoing description, not only do these devices provide material reclamation or pollution abatement but serve to prevent build-up of the particles, thereby preventing clogging of the conduits especially in and adjacent to the conduit bends.

It is an even further object of the dust suppressor to promote economic advantages for a user thereof as well as contribute to benefit the national program for a cleaner atmosphere.

Other objects, advantages and novel features of the invention will become apparent from the following detailed description of the invention when considered in conjunction with the accompanying drawings.

BRIEF DESCRIPTION OF THE DRAWINGS

FIG. 3 is a modified particle suppressor illustrated in FIG. 2;

FIG. 5A is an unfolded upper half portion of a conduit bend illustrating a deflecting device made in accordance with the principles of the invention;

FIG. 5B is an elevational view illustrating the deflecting device shown in FIG. 5A;

DETAILED DESCRIPTION OF THE PREFERRED EMBODIMENT

Figure 1:
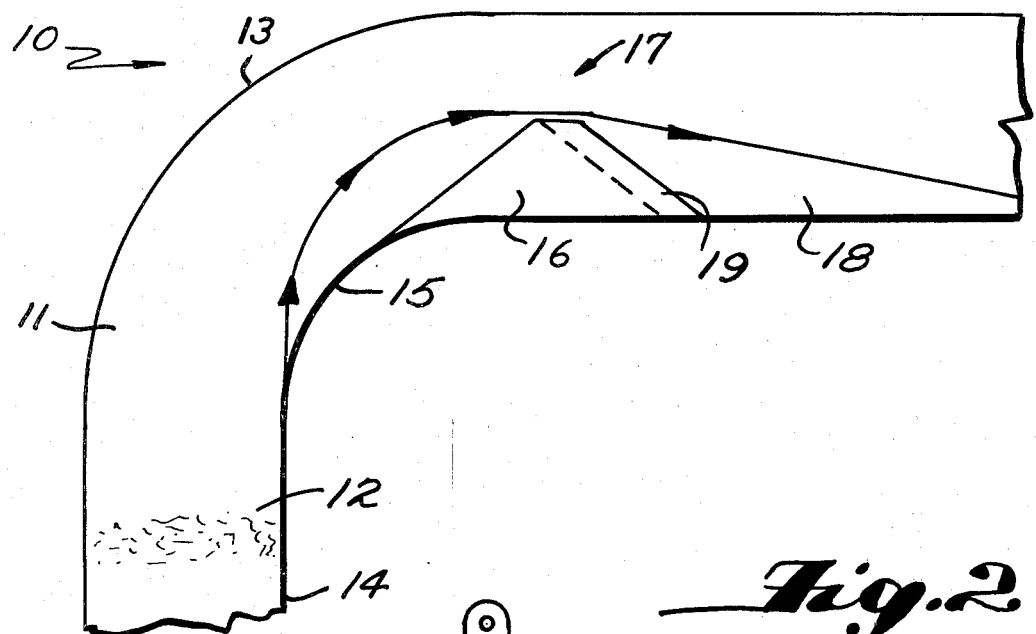
FIG. 1 is a diagrammatic view illustrating the disadvantages prevalent in a prior art conduit bend.

Now referring to the Figures of the drawing, wherein FIG. 1 discloses a conventional conduit bend 10 used in a system that transports a stream 11 of pressurized fluid medium, especially air or gas, carrying suspended particles 12. This Figure does not illustrate the use of the present invention, but rather the difficulties encountered in the prior art which are overcome thereby.

As aforediscussed, the velocity of the stream varies as it travels through the conduit. If a cross-section of the stream were taken it would reveal that the stream at the center of the conduit moves much faster than the air or gas around the periphery or inner walls. The difference in velocity is attributed to the friction resulting from contact between the air or gas stream and the inner walls. This causes turbulent flow adjacent the inner walls. The turbulent flow gradually diminishes towards the center of the conduit to a region of less turbulent or laminar flow and maximum velocity.

Also, as is known, air has mass and if the mass is constant per unit volume of the flowing air or gas stream 11, then there is more energy at the center of the conduit because the mass is moving fastest at this point. Thus, there exists a low velocity-energy region around the periphery of the conduit and a high velocity-energy region at the center thereof. Consequently, as the air or gas stream traverses the conduit bend, Newton's law of motion is applicable and the dominant energy at the center of the conduit forces the lower energy air or gas stream against the outer radius 13 of the conduit and creates a velocity higher than the highest velocity that prevailed at the entrance 14 to the conduit bend. To compensate for this higher velocity an energy balance, in accordance with Bernoulli's theorem of the conservation of energy, will indicate a velocity lower than the lowest velocity, that prevailed at the entrance to the conduit bend, exists at an inner radius 15.

It is at this low velocity-region that the particles which do not fall under the influence of the dominating energy portion of the air or gas stream, trail off to make up the low velocity-energy region at the inner radius of the conduit. The larger particles in this portion of the air or gas stream settle out in this low velocity-energy region or critical zone and a build-up of particles 16 begins. In addition, particles in the high velocity-energy region of the air or gas stream are forced closer together due to the compressing action resulting from a change in flow directions and because of the accelerating and decelerating of the particles the result is an increase in the incidence of collision therebetween, thereby forcing other particles from the high velocity-energy portion of the air or gas stream. Consequently, these particles add to the fall-out.

After this initial build-up 16 of particles occurs, an orifice 17 is formed within the duct. Because of the difference between the internal angle of shear of the particles and the expansion angle of the air or gas at the higher velocity, there exists another low velocity-energy region 18 downstream of the initial build-up 16.

As the air or gas at the higher velocity flows through the orifice, it forms a vena-contracta. Due to the vena-contracta, the air or gas does not expand immediately upon passing through the orifice and this permits the initial build-up 19 to grow. Then, as additional build-up grows, the vena-contracta moves further downstream. Therefore, the particles continually build up until they eventually enter other equipment (not shown) which in turn detrimentally affects the operating efficiency thereof.

Figure 2:
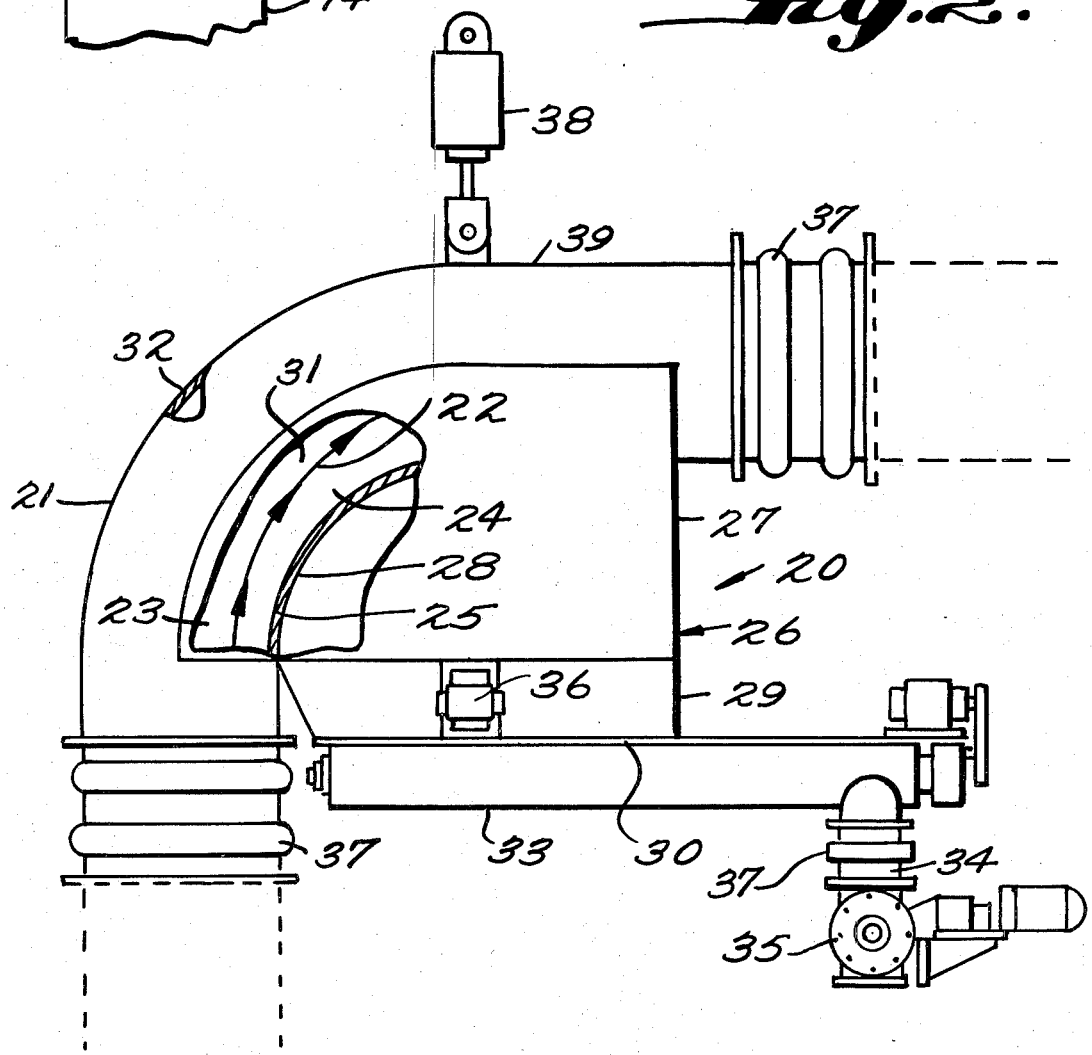
FIG. 2 is an embodiment of the particle suppressor made in accordance with the principles of the invention.

FIG. 2 discloses one of the preferred embodiments of the dust suppressor 20 made within the scope of the invention. The dust suppressor is illustrated as being operatively attached to a conduit 21. The conduit is located in a conventional air or gas handling conduit system (not shown) and conveys a stream 22 carrying suspended particles 23. The conduit bend is preferably but not necessarily located upstream of a conventional blower (not shown). By use of a blower upstream of the flow, a negative pressure exists in the conduit system. In order to keep the particles suspended in the stream it is necessary for the blower to provide the stream with high velocity. The velocity in fact must be several times faster than the terminal or critical velocity of the largest particle being conveyed.

As mentioned earlier, it is an important feature of the present invention to connect the suppressor 20 to a low velocity-energy region 24 located adjacent the inner radius 25 of the conduit bend. The low velocity-energy region is the critical zone where the particles settle to as the stream 22 changes direction from, for example, generally vertical to generally horizontal. The dust suppressor of this particular embodiment has a collection means 26 which includes an upper portion 27. Upper portion 27 is suitably attached by conventional means to the inner radius 25 so as to intersect the conduit walls. The intersection of the conduit duct and the upper portion of the collection means defines an opening 28 through which the particles will fall.

Downwardly disposed from and preferably integrally connected with the upper portion is a lower portion or hopper-like member 29. The hopper has inner walls that can assume any of a number of configurations, so long as the walls are inclined at an angle which will be greater than the angle of shear for the type of particulate being conveyed. In this manner, the particles will not build up along the walls in the hopper but will descend towards an outlet 30 formed at the bottom thereof.

It is believed that the operation and function of the above noted suppressor apparatus is apparent from the above detailed description thereof. Nevertheless, a brief description will follow. As the stream 22 of air or gas changes direction from a generally vertically upwardly directed path to a generally horizontally directed path at the bend in the conduit, the stream will form a high velocity-energy region 31 adjacent the inner wall 32 defined by the outer radius of the bend. As aforementioned, opposite the high velocity-energy region is the low velocity-energy or critical zone of the bend to which the heavy and deflected solid particles settle and are trapped by the collection means 26. Thus, the suppressor apparatus is effective to remove solid particulate from the critical zone of a bend and thereby substantially minimize particle build-up in the conduit. The suppressor apparatus offers several other advantages in that it can reclaim the particle fall-out in the driest state possible which would eliminate the need for unnecessary dehydration. Also, said suppressor provides less maintenance and a higher operating factor of the system than could otherwise be obtained.

The dust suppressor 20 of this embodiment is also combined with means for facilitating removal of particles from the hopper. Arranged at the bottom of the hopper is one end of air-tight conveyor 33 having a conventional auger (not shown). The conveyor auger is operated by a conventional motor. A duct 34 is located at the other end of the conveyor so as to communicate with a rotary air lock feeder 35. The air lock feeder is also operated by a conventional motor.

The air lock feeder is effective to discharge the accumulated particulate matter trapped within the hopper while maintaining substantially the same pressure within the dust suppressor. Therefore, the discharge of the particles is accomplished without disrupting the continuity of the conduit system. Further, any of a number of other well known equivalents can be substituted for the air lock feeder such as butyl rubber flutter-type valve.

In certain circumstances sticky or tacky particulate matter is conveyed and it has a tendency to build up on the inner walls of the hopper. In order to alleviate this occurrence, a vibrator 36 is attached to the outside of the hopper and is periodically operated to shake off sticky particles. When using the vibrator, it becomes necessary that flexible isolation joints 37 be placed upstream and downstream of the bend as well as between the conveyor and air lock feeder so as to isolate and thereby prevent the vibrations effecting other portions of the air handling conduit system. Additionally, a spring hanger 38 is attached to the top surface 39 of the conduit bend 21 so as to further isolate the induced vibrations produced by the vibrating device from the supporting structure.

FIG. 3 is a side elevational view of a second embodiment of the dust suppressor similar to that disclosed in FIG. 2, wherein like reference numerals indicate like structure. As can be seen from this embodiment the upper 27' and lower 29' portions of the dust suppressor 20 have a somewhat different configuration. It should be pointed out that the configuration is a function of the material conveyed. That is, the angle of inclination of the inner walls is chosen so as to facilitate particles descending to the outlet 30 by having the angle suitably correlated to the shear angle of incidence of the particles.

The dust suppressor is suitably attached by standard fastening means to the inner radius 25 of the conduit bend at the critical zone and in this manner traps the particles that settle from the high velocity-energy region 31 of the stream to the low velocity-energy region 24 of the stream. In this modification, the arrangement between the conveyor 33 and the rotary air lock device 35 is reversed. In other words, the rotary air lock device is connected directly to the outlet 30 of the bottom end of the hopper 29' by means of a duct. Situated below the rotary air lock is the conventional conveyor 33 of the type described above. As is apparent, this embodiment operates and functions in a similar manner as described with respect to the embodiment of FIG. 2. Additionally, if sticky or tacky particulate is conveyed, the hopper can have attached thereto the vibrating device 36 which is useful in preventing build-up of the particulate along the inner walls of the hopper so as to promote descent of particles towards the discharge outlet. Also, as was discussed above, if sticky particles are being conveyed the vibrating device is employed and in order to prevent damage and loosening of the conduit bend from the remainder of the system, flexible joints 37 are used. The flexible joints are attached to the upstream and downstream ends of the conduit bend as well as at the duct connecting the hopper 29' to the air lock device 35. Furthermore, the spring hanger 38 is used so as to properly mount the conduit bend and isolate its vibration from the supporting structure.

Figure 4:
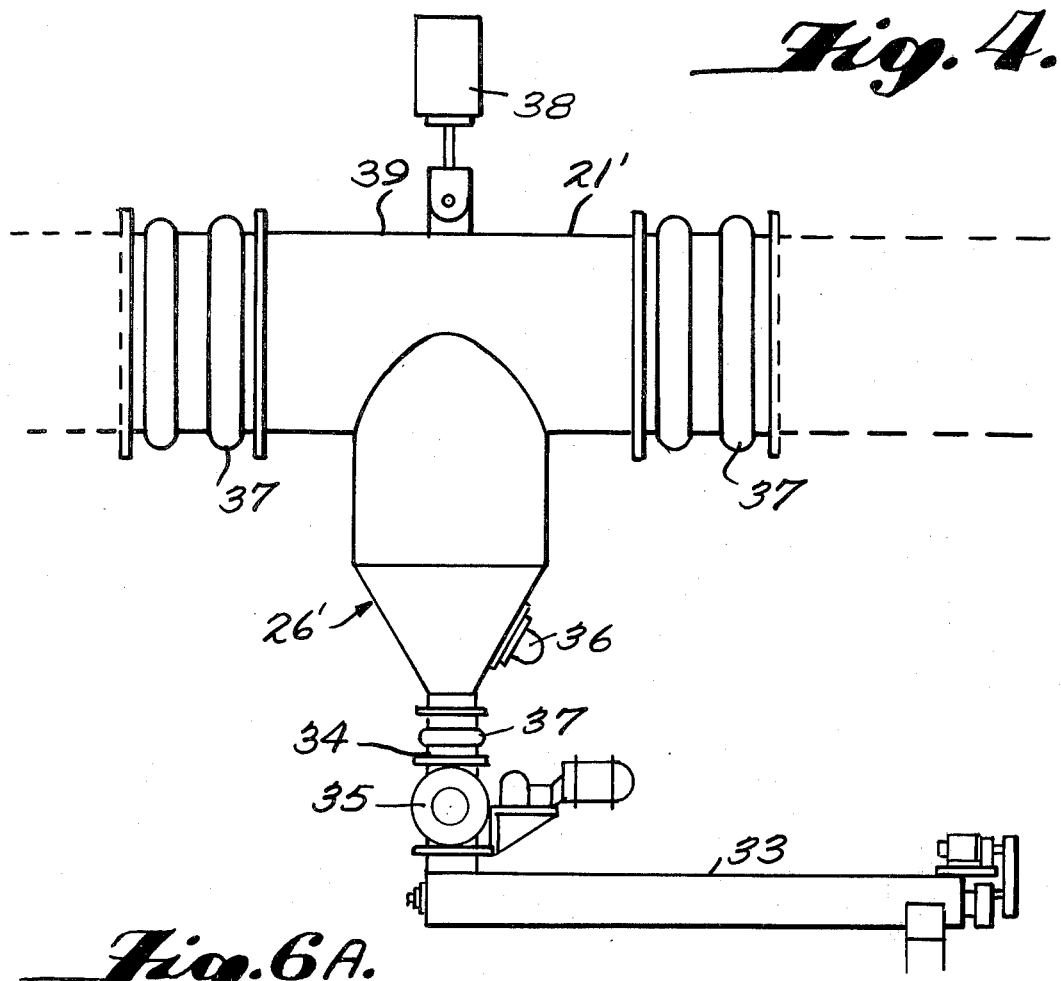
FIG. 4 is a second modification of the particle suppressor illustrated in FIG. 2.

FIG. 4 discloses another embodiment similar to the previously disclosed embodiments, in that the dust suppressor 20 is suitably attached to the conduit system. As in the previous embodiment like reference numerals indicate like structure. The dust suppressor is directly attached to the lower portion of a straight conduit 21' adjacent the inner radius of a conduit bend (not shown). It is especially effective in minimizing build-up by removing particles adjacent to and downstream of a vertical or horizontal bend in the conduit system. Inasmuch as the stream has a low velocity-energy region located along the internal periphery of the walls, the aforenoted principle of having the heavier particles settle towards the low velocity-energy region will also be applicable in this arrangement. Therefore, the location of the dust suppressor adjacent and downstream of a vertical or horizontal bend will produce similar results in that the particles will settle or drop into the collection means 26'. This modification being similar to the aforementioned, operates and functions in a similar manner. Thus, a detailed description of its operation is believed obvious. Additionally, the vibrator 36 and vibrating isolation joints 37 can, when sticky or tacky particulate is being conveyed, be readily attached to the dust suppressor.

Since this type of arrangement is not located at the critical zone of a conduit bend, its primary function is to halt continued particle build-up adjacent to and downstream of the critical zone. This embodiment has been found to be especially effective when used in combination with plows and/or fin-like devices, which are operatively placed in the conduit system. In this embodiment they are placed immediately upstream of the dust suppressor. The plows or fin-like devices are used primarily to increase the amount of particles that are deflected into the low velocity-energy region, producing an increase in particle fall-out. It has been found that these devices are especially effective in providing reclamation of valuable product in the driest state possible eliminating the need for unnecessary dehydration and/or pollution abatement benefits.

FIGS. 5A and 5B disclose a plow 40 of the continuous type that depends from the inner wall 32 of the conduit 21 defined by the outer radius thereof. The height range of the depending plow varies with the diameter of the conduit. In particular, FIG. 5A discloses an unfolded upper half portion of the conduit. As can be seen, the continuous plow is comprised of two generally flat bar-like forward plow portions 41, 42 attached to rearward mounting members 43 that are forwardly inclined relative to the flow of the stream. The mounting members 43 are formed as thin post-like gussets and are suitably attached to the inner wall of the conduit. Mounting members 43 are spaced along the length of the bar-like forward portions 41, 42 a distance equal to approximately D/3 to D/10; wherein D is equal to the diameter of the conduit. The bar-like forward portions 41, 42 are positioned so as to form a generally V-shaped wedge 44 on the unfolded pattern which when formed in a half-circle has a tendency to create a spiral to function as a deflecting member. The bar-like forward portions 41, 42 are preferably, but not exclusively, made from rigid material.

As can be seen in FIG. 5B, the bar-like forward portion 41 is inclined forwardly with respect to a perpendicular line depending from the inner wall of the conduit. The leading corner 45 of this bar-like forward portion is so positioned that it coincides at point B (see FIG. 5A) with a bar-like splitter vane 46 which is attached to the inner wall 32 of the conduit so as to be perpendicular to the conduit wall and depend into the stream the same distance as the bar-like forward portions 41, 42. The point at which the bar-like splitter vane 46 commences is indicated in FIG. 5A as point A and is approximately one-third of the periphery of the outer radius of the conduit bend. The point at which the bar-like splitter vane 46 coincides with the bar-like forward portions 41, 42 is indicated in FIG. 5A as point B and is approximately two-thirds of the periphery of the outer radius of the conduit bend. The description of these points fits all conduit bends, regardless of the center line radius to the diameter ratio of the bend. Also the location of these points optimizes the separation of particles into the collection means 26.

It is to be understood that the deflecting members diverge at an angle $\alpha$ that can vary. By varying this angle of divergence it is possible to change the direction as well as degree of deflection occurring within the conduit.

As aforenoted, the distance or depth C to which the plow 40 descends into the stream depends upon the diameter of the conduit and is within the range of D/30 to D/90; wherein D is the diameter of the conduit. From experiment this height range has been found to be very effective in particle separation. As the stream flows in the direction of arrow E, particles at or near the high velocity-energy region will impinge upon the flat surfaces of the deflecting members 41 that define the generally V-shaped section 44.

The members function to deflect the particles in the high velocity-energy area around the periphery of the conduit and into the low velocity-energy region and thereafter into the collection means 26. The forward vane divides the particles into two streams. Then at point B, where the forward vane 46 coincides with the diverging plow portions 41, 42 one stream of particles is deflected to the right and the other stream is deflected to the left.

As noted the plow portions form a spiral around the inner periphery of the conduit commencing at the center line of the conduit on the outer radius in the high velocity-energy region and spiraling forward and downward around the inner wall of the conduit duct terminating in the low velocity-energy region immediately above the collection means. The divided streams of particles are deflected along this path and into the dust suppressor. The continuous plows are especially effective when dry or free flowing particles are being conveyed. It is to be further understood that the continuous plow of this invention can be used with any of the dust suppressor embodiments previously discussed, or any falling within the scope of this invention. If tacky or sticky particles are being conveyed, the vibrating accessories hereinabove discussed are preferably used.

Figure 6A:
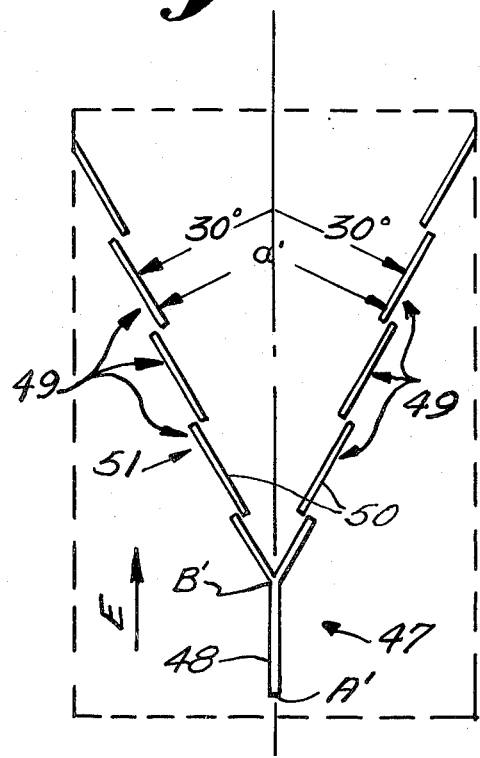
FIG. 6A illustrates an upper half portion of a conduit bend illustrating an alternate embodiment of the deflecting device shown in FIG. 5A.
Figure 6B:
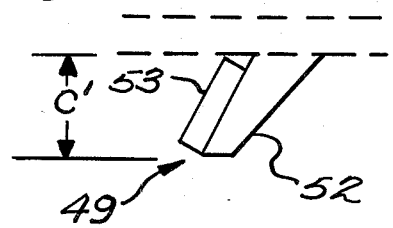
FIGS. 6B and 6C show end and elevational views, respectively, of the embodiment of FIG. 6A.
Figure 6C:
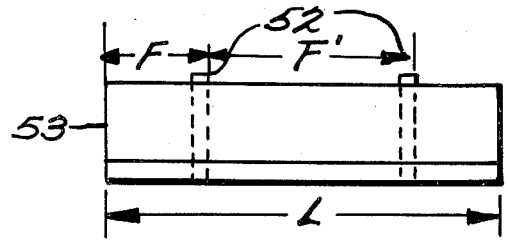

The noncontinuous or self-cleaning plows of this invention 47 are depicted in FIGS. 6A, 6B and 6C. As more particularly disclosed, FIG. 6A is a view of the unfolded upperhalf of the conduit illustrating the noncontinuous plows arranged so as to depend from the outer inner wall. The lead Y-shaped plow or wedge 48 of this embodiment has substantially the same configuration and location as the continuous plow described in FIGS. 5A and B. One difference, however, is that a plurality of plows 49 are used.

The plows 49 are so arranged in two staggered linear arrays 50, each of which diverges from the lead plow so as to create a substantially V-shaped wedge formation 51. This particular arrangement basically corresponds in operation to that of the diverging deflecting surfaces 41 of the continuous plows. Similarly, an angle $\alpha'$, at which the noncontinuous plows diverge, can be varied so as to change the amount and direction of deflection.

Points A' and B' indicate two preferable positions at which the forwardmost and rearwardmost colinear positions, respectively, of the lead wedge or plow 48 can be positioned relative to the inner wall. Point A' is a point in a plane that is at the intersection of the plane and the outer radius and is located approximately at a point which is one-third of the periphery of the outer radius of the conduit bend. Point B' is a point in a plane that corresponds to the intersection of the plane and the outer radius and is located approximately at a point which is roughly two-thirds of the periphery of the outer radius of the conduit bend.

FIGS. 6B and 6C show side elevational and end views of one segment of the non-continuous plows 47. In FIG. 6C, there are preferably two mounting members 52 that are arranged so as to depend from the inner wall into the stream of particles. The mounting members are forwardly inclined relative to the flow of the stream and have a generally flat rectangular surface 53 attached thereto. Each mounting member is preferably formed as a thin post-like flange. The generally flat rectangular surface 53 is preferably, but not necessarily, made from a resilient material and is suitably secured by any of a number of conventional means to the mounting members (e.g., adhesive bonding). A non-resilient Teflon coated surface could be equally as effectively used to provide the self-cleaning feature.

For optimum deflection results, the vertical distance C' at which the non-continuous plows descend into the stream varies within a range from D/30 to D/90; wherein D is equal to the diameter of the conduit. Further, the spacing of both mounting members 52 to the respective ends of the surface 53 is equal to F and the spacing between themseleves is equal to F', wherein F is approximately equal to L/4 and F' is equal to L/2 respectively, and L varies within the range from D/3 to D/10.

The noncontinuous plows are useful in removing particles, especially when sticky or tacky. The plows are self-cleaning in that when sticky or tacky particles build up on the resilient material of the lead surface 53, the member deflects breaking the bond of the build-up and the particles are dislodged and in this manner, preventing a caking or building up of particles. Furthermore, the vibrating device 36 and vibration isolation devices 37, as described in greater detail with respect to FIG. 2, can be herein utilized.

FIGS. 7A, 7B, and 7C, 7D, respectively, disclose a symmetric vane 54 or fin-like deflector and an asymmetrical vane or fin-like deflector 55. Both types are suitably attached to the inner wall 32 of the bend so as to depend into the high velocity-energy region of the stream preferably at/or adjacent to the dust suppressor.

Each fin-like deflector 54, 55 has a snub end surface 56, 56' and an aerodynamic surface 57, 57', respectively. Both of the snub end and aerodynamic end surfaces can, if desired, be directed so as to face the flow of the particle stream. Each surface is especially effective in handling certain types of particles.

The snub end 56 of the symmetrical or unbiased fin 54 has a generally flat planar surface formed at an incline with respect to the longitudinal axis 58 of the fin. The direction of incline is rearwardly or in the direction of particle flow. The angle of inclination $\beta$ of this surface can be made to vary. By varying this angle of inclination, it is possible to control the amount and direction or path the particles are deflected after it strikes this surface. The snub end surface deflects the particles towards the center of the stream where it increases the incidence of collision between the particles. Consequently, some of the particles that have collided are urged towards the low velocity-energy region of the bend and thereafter into the collection means of the dust suppressor.

Figure 7A:
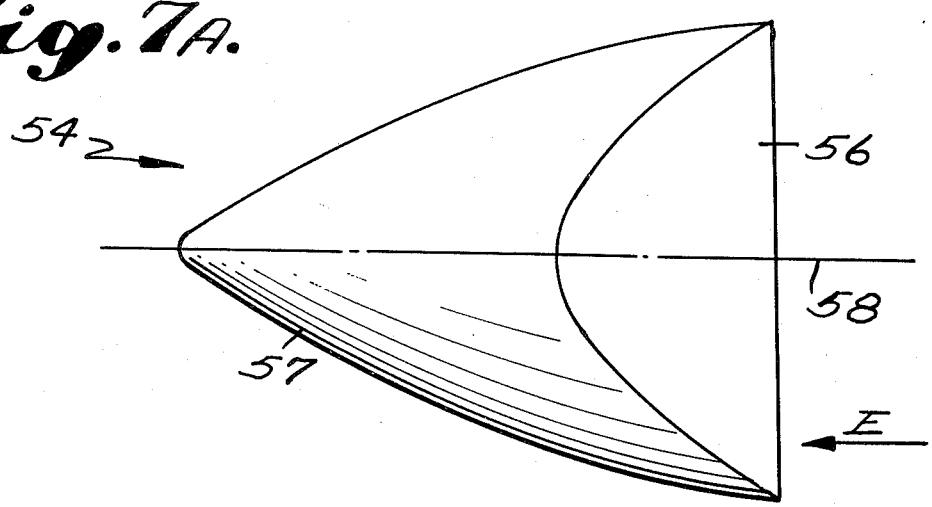
FIGS. 7A and 7B show a plan and elevational view respectively, of a fin-like deflector made in accordance with the principles of the invention.
Figure 7B:
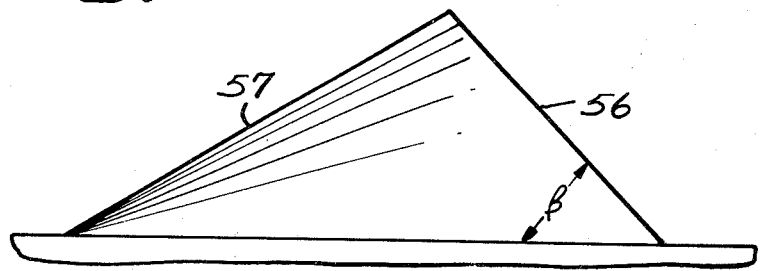
Figure 7C:
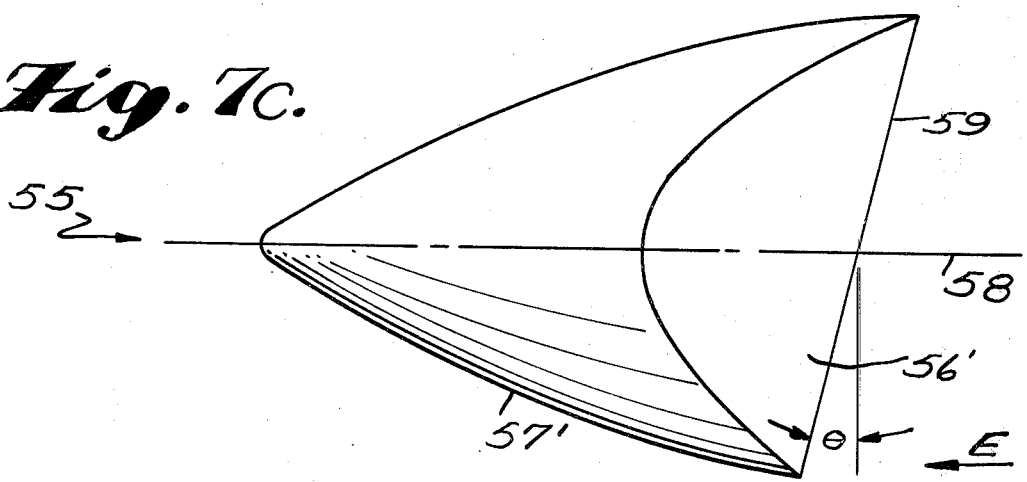
FIGS. 7C and 7D show a plan and elevational view, respectively, of an alternate embodiment of the fin-like deflector shown in FIGS. 7A and 7B.
Figure 7D:
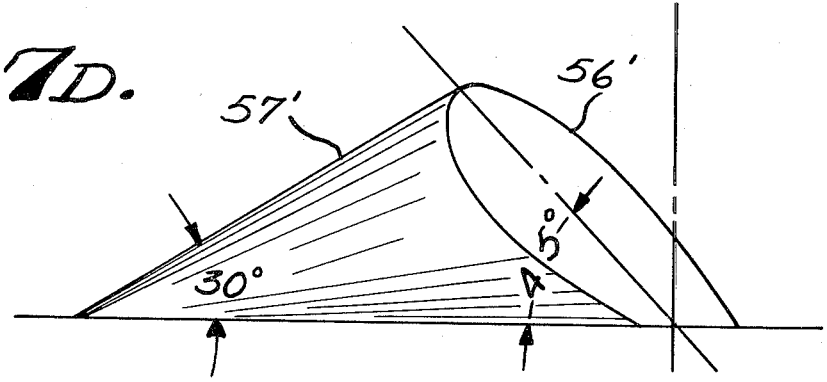

The snub end surface, as best shown in FIG. 7C, defines a biased fin. The surface of this asymmetrical fin, while not only being rearwardly inclined, is formed so that it has a rearward sloping deflection angle $\theta$. As seen, the top edge 59 of the snub end surface 56' contacting the inner wall 32 traverses the longitudinal centerline of the fin at this rearward sloping angle $\theta$. This angle of transverse deflection can be made so as to vary the amount as well as lateral downward directions to the deflected particles.

If, however, the particles being conveyed are of a substance which is sticky or tacky, therefore having a tendency to cling to the surfaces upon which it contacts, the aerodynamic surface 57, 57' of the fin devices is employed. The fin devices 54 and 55 are secured to the inner wall of the conduit so as to have the aerodynamic surface contact the flowing stream. In this position, the aerodynamic surface 57, 57' serves two functions in that it:

1. increases the incidence of collision between particles within the stream by directing a portion of the particles to the center of the stream; and 2. promotes agglomeration of the sticky or tacky particles being conveyed.

Agglomeration results when adhesive or cohesive particles contact each other with sufficient force that they tend to stick together and form a particle having a greater mass. Therefore, the newly formed agglomerated particle being heavier falls to the lower portion of the stream and in doing so also increases the incidence of collision between it and other flowing particles. The agglomeration creating heavier particles, and the increase in the incidence of collision results in more particles falling towards the low velocity-energy region, whereby they will be thereafter trapped in the dust suppressor. As is apparent, the use of either the biased or unbiased fin devices whether using the snub end or aerodynamic end is effective in pollution abatement and/or in the reclaiming of valuable products.

The positioning in the conduit of the biased and nonbiased snub end surfaces 56, 56' of the fin devices 54, 55 respectively as well as the aerodynamic surfaces, 57, 57' thereof is of further importance in optimizing particle fall-out.

Figure 8A:
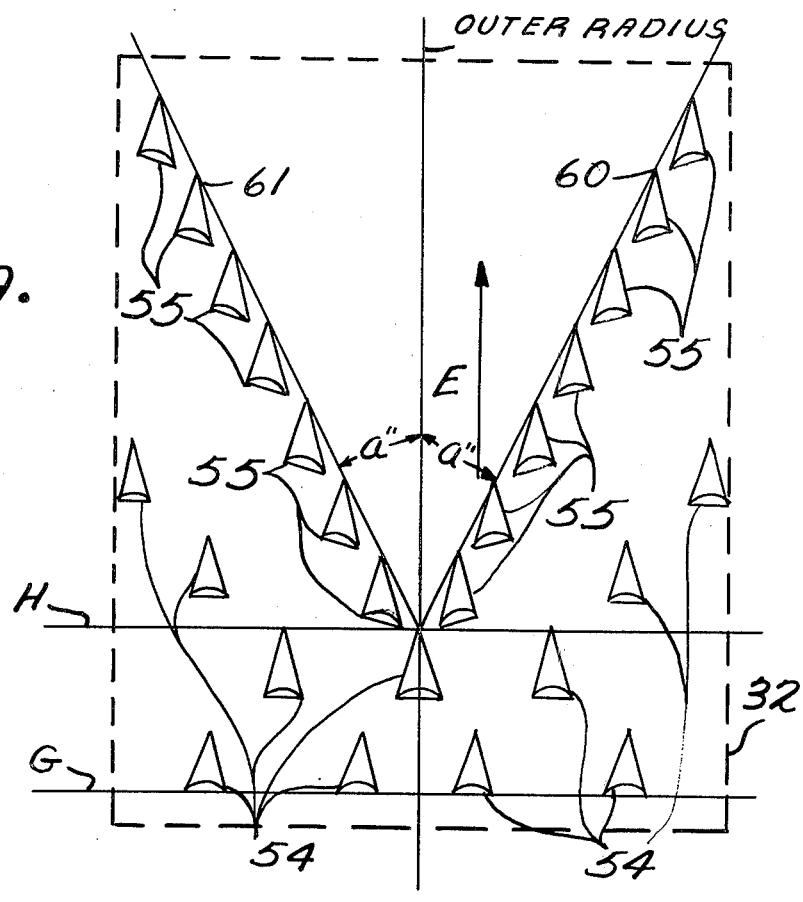
FIGS. 8A and 8B show different arrangements of the deflectors of FIGS. 7A–D relative to the unfolded upper half portion of the conduit bend.

As is shown in FIG. 8A of the drawings, a preferred arrangement of both the biased and non-biased snub end surfaces 56, 56' facing the particle flow is exemplified. This Figure shows as unfolded the inner wall 32 of the conduit with both types of fin devices depending therefrom. Located upstream of the conduit is a plurality of the unbiased fin devices 54. Preferably, they are arranged in a row located along the line G which transversely intersects the outer radius at a point which corresponds to approximately one-third of the periphery of the outer radius of the conduit. Other unbiased snub end fin devices 54 diverge outwardly away from the centerline of the outer periphery of the conduit.

A second row downstream of the first is formed so that the rearward points of the aerodynamic surfaces 57 terminate at a line H. This line transversely intersects with the outer radius at a distance which approximately corresponds to two-thirds of the periphery thereof.

The biased snub end fin devices 55 are so arranged as to form a substantially V-shaped formation. One leg 60 of the V-shaped formation has the snub end surfaces in such a direction as to have the surface laterally deflect the particulate downwards and towards the center of the bend. The oppositely diverging leg 61 of the V-shaped formation has the biased surfaces arranged in an opposite direction so that the particulate is also laterally deflected downwards and towards the center of the stream. The angle $\alpha''$ at which each leg diverges from the outer radius of the conduit can be made to vary and by varying this angle the amount of particles deflected will correspondingly vary. It is to be noted that in this embodiment the rearward point of each aerodynamic surface 57 is located so as to contact the leg of the V-shaped formation.

Figure 8B:
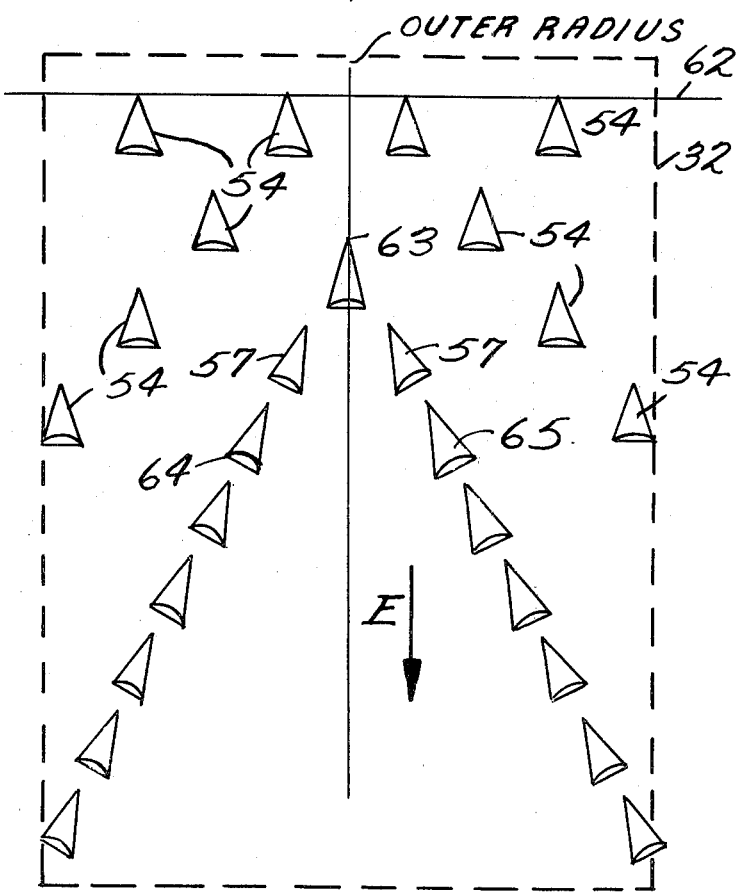

As particularly noted in FIG. 8B, there is disclosed another unfolded inner wall of the conduit. However, in this embodiment there is shown a different arrangement, wherein the aerodynamic surfaces of the unbiased fin device 54 face the flow of particulate. A first row of the unbiased devices 54 is suitably attached to the inner wall along a line 62 that corresponds to a plane that intersects the outer radius of the conduit, at a point that is approximately one-third of the periphery thereof. Other fin devices 54 similar in construction diverge away from the centerline of the conduit in a substantially V-shaped formation. The V-shaped formation increases the lateral deflection of the particles toward the center of the stream. The apex 63 of this V-shaped formation is located at a point in a plane that intersects the outer radius of the conduit at a distance approximately equal to two-thirds of the periphery of the outer radius. Each leg 64, 65 of the V-shaped formation has the aerodynamic surfaces 57 at an angle to their longitudinal axis.

As viewed in the direction of particle travel indicated by the arrow E, the upper leg 64 has the fins 54 canted approximately 15° leftward relative to their longitudinal axis and the lower leg has the fins canted approximately 15° rightward relative to their longitudinal axis. It is to be understood that this canting angle can be varied in accordance to the type of particles being conveyed and the desired amount of deflection. Furthermore, the angle of divergence of each leg 64, 65 from the centerline of the inner wall of the conduit can also vary so as to effectuate the same type of results that would be accomplished by changing the canting angle. It is to be noted that each apex of the aerodynamic surface 57 contacts the leg.

As aforediscussed, the aerodynamic surfaces 57 are used when sticky or tacky particles are being conveyed so as to increase particle fall-out. The surfaces deflect the particles laterally and downwardly from the high velocity-energy region of the conduit to the low velocity-energy region thereof. Also, since sticky particles are moving, agglomeration will result and form heavier particles which in turn further increase the incidence of collision. The canting of the aerodynamic surfaces 57 further increases the lateral deflection towards the low velocity-energy region of the stream so as to even further enhance and optimize particle fall-out and agglomeration.

As hereinabove described, the use and arrangement of both the continuous and non-continuous plows, the biased and non-biased snub end surfaces, as well as the aerodynamic surfaces, increases particle fall-out. By increasing the particle fall-out into the collection means described in FIGS. 2 to 4, it is possible to provide such features as: pollution abatement, increasing the reclamation of particles, improving system performance and more importantly preventing build-up of particles at/or adjacent the critical zone of a conduit bend.

Although herein shown and described is what is conceived to be the most practical and preferred embodiments, it is recognized that departures may be made therefrom within the scope of the invention which is to be accorded in the full scope of the claims so as to embrace any equivalent devices and methods.

What is claimed as novel and desired to be protected by Letters Patent is set forth in the appended claims.

What is claimed is:

1. A device for separting particles conveyed in a stream of pressurized fluid in a conduit, wherein the flow of the stream creates a high velocity-energy region and a low velocity-energy region, as the stream changes direction at a bend in the conduit, wherein a collection means is secured adjacent to the low velocity-energy region of the conduit comprising:

means positioned above the collection means and operatively connected to an inner wall of the conduit so as to depend into the high velocity-energy region having at least two diverging surface means that form a substantially V-shaped formation that faces the flowpath of the stream;

said two diverging surface means including a leading edge that is inclined forwardly with respect to the inner wall of the conduit and faces the flowpath of the stream; and a third means connected along the leading edge so as to extend into the flowpath of the stream having a portion thereof in a plane that corresponds to approximately one-third of the periphery of the outer radius and the leading edge having a leading corner that corresponds to a point of intersection of a place that corresponds to approximately two-thirds of the periphery of the radially outer portion of the bend.

2. The device as claimed in claim 1 wherein each of said two surface means is formed from a plurality of separated generally flat surface members.

3. The device as defined in claim 2 further comprising:

a depending leading Y-shaped plow means positioned at the apex of the V-shaped wedge formed by said two surface means.

4. In combination with a conduit bend having an inner wall comprising at the bend thereof an outer radius segment and opposite thereto an inner radius segment for use in an air-handling system carrying a pressurized stream of particles that forms a high velocity-energy region at the outer radius and a low velocity-energy region at the inner radius as the stream changes direction within the conduit bend; a plurality of fin-like separators operatively arranged at the outer radius including: at one end a snub surface means for providing a movement to the particles towards the center of the stream, thereby increasing the incidence of particle collision and forcing some of the particles towards the low velocity-energy region, and an aerodynamic means at opposite end thereof for increasing the incidence of collision as well as providing for agglomeration of sticky particles, both said snub surface and aerodynamic means being selectively positionable to face and contact the stream of particles; and a collection means attached to the inner radius that defines an opening through which the particles that fall-out from the high velocity-energy region, settle into the collection means, thereby preventing build-up of particles at the inner radius.

5. The combination as defined in claim 4 wherein the plurality of fin-like particle separators are operatively connected to the inner wall so as to form a V-shaped wedge with a forward portion of the wedge facing the stream and forward of the wedge at least one row of fin-like separators that are along a line that is at the intersection of a first plane passing through the inner wall of the bend.

6. The combination as defined in claim 5 wherein the first plane intersects the inner wall adjacent the outer radius at a point that corresponds to approximately one-third of the periphery thereof.

7. The combination as defined in claim 5 wherein the row formed by the snub end means has generally flat surfaces that are rearwardly inclined relative to the inner wall.

8. The combination as defined in claim 5 wherein each leg of the wedge has a generally flat surface that is inclined relative to the inner wall and oriented in a direction that is at a transverse angle to the longitudinal axis of the device for providing deflection to the particles that strike thereagainst.

9. The combination as defined in claim 5 wherein each leg of the wedge beings at the intersection of a second plane passing through the outer radius of the inner wall of the bend.

10. The combination as defined in claim 9 wherein the second plane intersects the inner wall adjacent the outer radius at a point that corresponds to approximately two-thirds of the periphery thereof.

11. The combination of claim 5 wherein the row is formed by said aerodynamic means facing the stream.

12. The combination of claim 5 wherein the plurality of fin-like separators forming each leg of the wedge is formed by said aerodynamic means facing the stream wherein each aerodynamic means along one leg is canted at an angle to the longitudinal axis of the aerodynamic means and which is equal and opposite in direction to the cant angle of each of aerodynamic means of the opposite leg so as to increase the lateral deflection of the particles towards the low velocity-energy region of the stream.

13. The combination as defined in claim 4 further comprising:

a vibrating means operatively attached to said collection means for preventing build-up of particles therein, a spring-hanger device connected to the conduit bend and flexible joints attached at least at upstream and downstream ends of the bend for isolating vibration from the remainder of the air-handling system.

14. The combination defined in claim 4 further comprising:

a means for discharging particles that have settled into the collection means while maintaining substantially the same pressure throughout the conduit bend.

15. The combination defined in claim 14 further comprising:

a conveyor means operatively connected to said discharging means and said collection means for conveying discharged particles for subsequent handling.

16. In combination with a conduit bend having an internal wall comprising at the bend thereof an outer radius segment and opposite thereto an inner radius segment for use in an air-handling system carrying a pressurized stream of particles that forms a high velocity-energy region at the outer radius and a low velocity-energy region at the inner radius; a collection means secured adjacent to the low velocity-energy region of the conduit for trapping particles that descend from the high velocity-energy to the low velocity-energy region; and a device operatively connected to outer radius segment at a position above said collection means comprising two diverging surface means that forwardly depend into the high velocity-energy region of the stream and faces the flow path of the particle stream, said two diverging surface means form a substantially V-shaped wedge for deflecting particles, around the periphery of the conduit and into the low velocity-energy region and thence into said collection means.

17. The combination of claim 16 wherein said two diverging surface means join together at the apex of the V-shaped wedge and form a leading edge.

18. The combination defined in claim 17 further comprising a splitter vane means attached to the leading edge for dividing the flow of the particles.

19. The combination as defined in claim 17 wherein a point on the splitter vane coincides with a point in a plane that intersects the outer radius at approximately one-third of the periphery thereof.

20. The combination as defined in claim 18 wherein the leading edge has a leading corner that is positioned at a point that coincides with the intersection of a plane that corresponds to approximately two-thirds of the periphery of the outer radius.

21. The combination as defined in claim 18 wherein each one of said two diverging surface means is formed from a plurality of separated generally flat resilient surface members that are self-cleaning.

22. The combination as defined in claim 18 further comprising:

a leading Y-shaped plow means positioned forwardly of said two depending surface means at the apex of the V-shaped wedge.

23. The combination as defined in claim 22 wherein the leading plow shaped means has a first forwardmost point and a second colinear rearwardmost point thereon, the first point is contained in a first plane and the second point is contained in a second plane, wherein the first plane and the second plane intersect the outer radius of the bend.

24. The combination as defined in claim 23 wherein the intersection of the first plane and the outer radius is at a point that corresponds to approximately one-third of the periphery of the outer radius of the bend.

25. The combination as defined in claim 23 wherein the intersection of the second plane and the outer radius is at a point that corresponds to approximately two-thirds of the periphery of the outer radius of the bend.

26. The combination as defined in claim 16 further comprising:
   a means for discharging particle fall-out that has settled into said collection means while maintaining substantially the same pressure throughout the air-handling system.

27. The combination as defined in claim 26 further comprising:
   a conveyor means operatively connected with said discharging means for conveying discharged particles for subsequent handling.

28. The combination as defined in claim 16 further comprising:
   a vibrating means operatively attached to said collection means for preventing build-up of particles therein; a spring-hanger device connected to the conduit bend; and flexible joints attached at least at upstream and downstream ends of the bend for isolating vibration from the remainder of the air-handling system.

29. A device for use in a conduit system having a conduit bend that changes the direction of a generally vertical flowpath of a pressurized stream of fluid containing suspended particles to a generally horizontal flowpath, the conduit bend having an inner wall at the bend thereof that includes an outer radius segment and opposite thereto an innner radius segment so that as the stream changes direction a high velocity-energy region will be formed adjacent the outer radius and a low velocity-energy region at the inner radius comprising:
   a collection means connected to the inner radius for trapping the particles that settle from the high velocity-energy region of the conduit bend to the low velocity-energy region of the conduit bend thereby preventing the build-up of particles at the inner radius segment;
   a vibration means operatively attached to said collection means for preventing build-up of particles along the inner walls of said collection means by vibrating said collection means;
   means connected to the conduit bend for isolating vibration of said collection means produced by said vibration means from the remainder of the supporting conduit system;
   said vibration isolating means comprising:
   a spring-hanger connected to the conduit bend and flexible joints connected at least at each end of the conduit bend.

30. The device as claimed in claim 29 wherein said collection means forms an opening with the conduit bend.

31. The device as claimed in claim 29 wherein said collection means is formed of an upper portion and a hopper shaped lower portion having a discharge outlet.

32. The device as claimed in claim 29 further comprising:
   a discharge means operatively connected to said collection means for discharging from said collection means particles that have settled therein while maintaining substantially the same pressure within the conduit system.

33. The device as claimed in claim 32 further comprising:
   a conveyor means operatively connected to said discharge means and said collection means or effectuating conveyance of discharged particles for subsequent handling.

34. A fin-like separator device operatively connected with the internal wall of a conduit, which conduit system has conveyed therethrough a pressurized stream of fluid medium containing suspended particles, the fin like separator device comprising:
   a snub means having a generally flat surface which is inclined at a compound angle relative to the longitudinal axis of the conduit from the inner wall of the conduit where said device is mounted, simultaneously in these two senses:
   a. proceeding along the generally flat surface from nearer the conduit internal wall towards the longitudinal axis of the conduit, the generally flat surface inclines downstream, to increase the incidence of collision of the suspended particles in the stream by deflecting suspended particles which are near the internal wall towards the center of the stream when the generally flat surface faces the stream and the stream impinges thereon;
   b. proceeding along the generally flat surface transversally of the longitudinal axis of the conduit, the generally flat surface is inclined laterally towards one side for providing lateral deflection of the suspended particles when the generally flat surface faces the stream and the stream impinges thereon;
   and an aerodynamic surface means, arched transverally and inclined in an opposite sense to the sense (a), said aerodynamic surface means extending from the internal wall to a generally arch-shaped juncture with said generally flat surface of the snub means, for deflecting said suspended particles when said aerodynamic surface means, but not the snub means, faces the stream and the stream impinges on the aerodynamic surface means,
   said opposite inclination of the generally flat surface and said aerodynamic surface means resulting in alternative use of the generally flat surface and the aerodynamic surface means, depending upon which direction the stream of fluid medium is being conveyed through the conduit, and, correspondingly, whether the stream impinges upon the generally flat surface or upon the aerodynamic surface means.

* * * * *